United States Patent [19]

Reiman et al.

[11] Patent Number: 4,663,109
[45] Date of Patent: May 5, 1987

[54] HELICAL AXIS STELLARATOR WITH NONINTERLOCKING PLANAR COILS

[75] Inventors: Allan Reiman, Princeton; Allen H. Boozer, Rocky Hill, both of N.J.

[73] Assignee: The United States of America as represented by the United States Department of Energy, Washington, D.C.

[21] Appl. No.: 586,619

[22] Filed: Mar. 6, 1984

[51] Int. Cl.⁴ .............................................. G21B 1/00
[52] U.S. Cl. .................................................. 376/142
[58] Field of Search ........................ 376/121, 133, 142

[56] References Cited

U.S. PATENT DOCUMENTS 3,002,912 10/1981 Spitzer, Jr. .
3,143,477 8/1964 Dolique .............................. 376/133
4,330,864 5/1982 Ohyabu ............................... 376/142

OTHER PUBLICATIONS

"Stabilization by Shear and Negative V", Plasma Physics & Controlled Nuc. Fus. Res., IAEA Vienna, vol. I, pp. 103-126, Furth et al.

9th Symposium on Engineering Problems of Fusion Research, Oct. 1981, pp. 582-585, Hunter.

"UWTOR-M-A Concep. Des. Study of a Mod. Stellarator Power Reac.", IEEE Trans. on Plasma Plysics, vol. PS-9, No. 4, pp. 163-172, Dec. 1981; Sviatoslavsky et al.

"The Interchangeable Module Stellarator", IEEE Trans. on Plasma Physics, vol. PS-9, No. 4, pp. 212-220, Dec. 1984, Anderson et al.

"Modular Coils: A Promising Toroidal Coil System", IEEE Trans. on Plasma Sci., vol. PS-9, No. 4, pp. 228-233, Dec. 1981, Chu et al.

"The Stellarator Approach to Toroidal Plasma Confinement", Nucl. Tech. Fusion, vol. 2, pp. 340-361, Jul. 1982, Johnson.

Primary Examiner—Deborah L. Kyle
Assistant Examiner—Richard L. Klein
Attorney, Agent, or Firm—Jeannette M. Walder; Gustavo Siller, Jr.; Judson R. Hightower

[57] ABSTRACT

A helical axis stellarator using only noninterlocking planar, non-circular coils, generates magnetic fields having a magnetic well and large rotational transform with resultant large equilibrium beta.

7 Claims, 4 Drawing Figures

HELICAL AXIS STELLARATOR WITH NONINTERLOCKING PLANAR COILS

CONTRACTUAL ORIGIN OF THE INVENTION

The United States Government has rights in this invention pursuant to Contract No. DE-AC02-76CH03073 between the U.S. Department of Energy and Princeton University.

BACKGROUND OF THE INVENTION

This invention relates generally to apparatus for confining a plasma, and more particularly to a modular stellarator.

In the development of a device to confine a thermonuclear plasma, an obvious choice was a torus with coils to produce a toroidal field spaced about the torus. However, this was soon found unsatisfactory. Because of the geometry of the torus, the toroidal field lines curved around the toroidal axis such that the force associated with the magnetic field gradient caused positively and negatively charged plasma particles to drift in opposite directions. This charge separation resulted in an electric field which destroyed the magnetic confinement. Consequently, in order to prevent charge separation in a torus, a poloidal magnetic field must be applied. The two major toroidal confinement devices: tokamaks and stellarators differ in the manner in which the poloidal magnetic field is applied.

In a tokamak, the poloidal field is applied by introducing a toroidal current in the plasma. One drawback of the tokamak is that the large plasma current needed for confinement carries a large free energy that can be tapped by instabilities which destroy the confinement. Another drawback of the tokamak is the relatively small values of beta achievable—typically only up to 6%. The tokamak is also not a steady-state device; it only operates during pulsed operation.

Beta, $\beta$, is the ratio of plasma particle pressure to the magnetic field. High values of beta are important for achieving high plasma temperatures and confinement times. High betas are essential if a fusion reactor using only deuterium fuel is to be realized. Currently, deuterium/tritium is the fuel or choice because the D-T reaction requires lower temperatures and confinement times than the D—D reaction.

In a stellarator, the poloidal field is produced externally to the plasma, generally by current-carrying conductor wound helically around the torus. Stellarators with helically wound conductor and toroidal field coils are said to have interlocked coils because the helical conductor winds in and around the toroidal field coils. Stellarators are capable of achieving betas several times greater than in a tokamak and are also capable of steady-state operation. The major drawbacks of stellarators have been the complicated coil structure required and the lack of easy access to the inside of the machine for repair due to the helically wound conductor.

Recently, several modular stellarator designs have been proposed. In a modular stellarator, both toroidal and poloidal fields are achieved by a single set of non-interlocking non-planar coils. These designs generally include a circular (non-helical) axis and hence do not have the high beta or stability of the more complicated interlocked stellarators. Although the non-planar coils are modular and easily replaceable, they are difficult to manufacture.

Another version of a modular stellarator is built using only non-interlocked, circular coils on a helical axis. While this stellarator is easily maintainable and the coils easily manufactured, the most unattractive feature of this stellarator is that it has a maximum average B (magnetic field) at low $\beta$—a magnetic hill. This condition implies instability for reactor grade plasmas.

It has been determined that stellarators which have magnetic wells—minimum average B at low $\beta$—have good stability properties. The measure of a magnetic well is determined by the sign of $V''$, the second derivative of volume per unit toroidal flux. Hence, when $V'' < 0$, there is a magnetic well. The stability beta limit is $\chi 2/2A$ where $\chi$ is the rotational transform and A is the stellarator aspect ratio. (Rotational transform is the average twist or rotation of a magnetic field line in a magnetic surface. Aspect ratio is the ratio of the torus major radius to minor radius.) Hence a large rotational transform in the presence of a magnetic well gives a large beta.

Therefore, it is an object of the present invention to provide a modular stellarator using planar coils having a magnetic well and large rotational transform.

It is also an object of the present invention to provide a stable plasma confinement device using only toroidal field coils.

It is another object of the present invention to provide a stellarator that can be easily maintained, dismantled and repaired.

Additional objects, advantages, and novel features of the invention will be set forth in part in the description which follows, and in part will become apparent to those skilled in the art upon examination of the following or may be learned by practice of the invention.

SUMMARY OF THE INVENTION

To achieve the foregoing and other objects and in accordance with the purposes of the present invention an apparatus for confining a plasma may comprise a closed endless tube; and a plurality of closed, curved, planar coils spaced about said tube, the centers of said coils defining a helical axis, said helical axis being substantially parallel to the axis of said tube, the plane of each coil being substantially perpendicular to said helical axis, the curve of each coil being defined in $\rho$, $\theta$ coordinates by the relationship: $\rho = a_c + \delta_2 \cos 2\theta + \delta_3 \cos 3\theta$, where $a_c$, $\delta_2$, and $\delta_3$ are constants and at least one of $\delta_2$ and $\delta_3$ is not equal to zero. When the helical axis is described by radius $r_o$, pitch $kr_o$, and period m, $a_c$, $\delta_2$, and $\delta_3$ satisfy the relationship:

$$\frac{\delta_3}{a_c} \geq \frac{(\delta_2/a_c)^2 + k^2 r_o^2 (1 + 5/4\, \delta_2/a_c)}{3(\delta_2/a_c)(1 + k^2 r_o^2)} \cdot \frac{a_c}{r_o}.$$

BRIEF DESCRIPTION OF THE DRAWINGS

The present invention is illustrated in the accompanying drawings wherein.

DETAILED DESCRIPTION OF THE INVENTION

The present invention generates stellarator fields having favorable properties (magnetic well and large rotational transform) by a simple coil system consisting only of unlinked planar non-circular coils. At large rotational transform toroidal effects on magnetic well and rotational transform are small and can be ignored. We do so herein, specializing in straight helical systems.

Figure 1A:
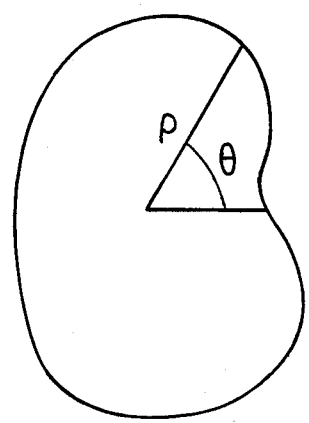
FIG. 1A shows the $\rho$, $\theta$ coordinate system.
Figure 1:
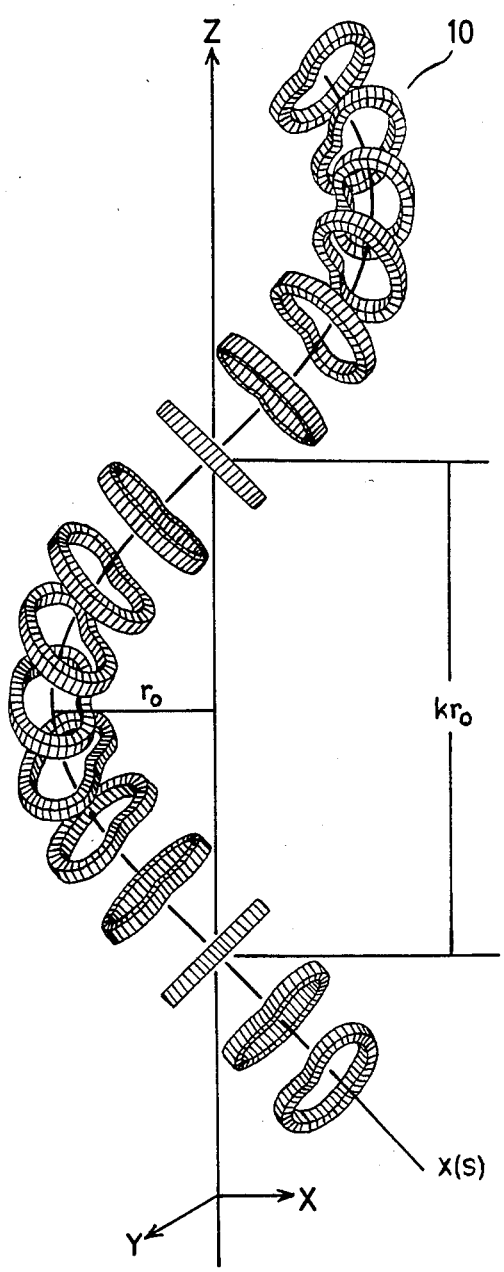
FIG. 1 shows a section of a typical coil configuration without a vacuum vessel.
Figure 4:
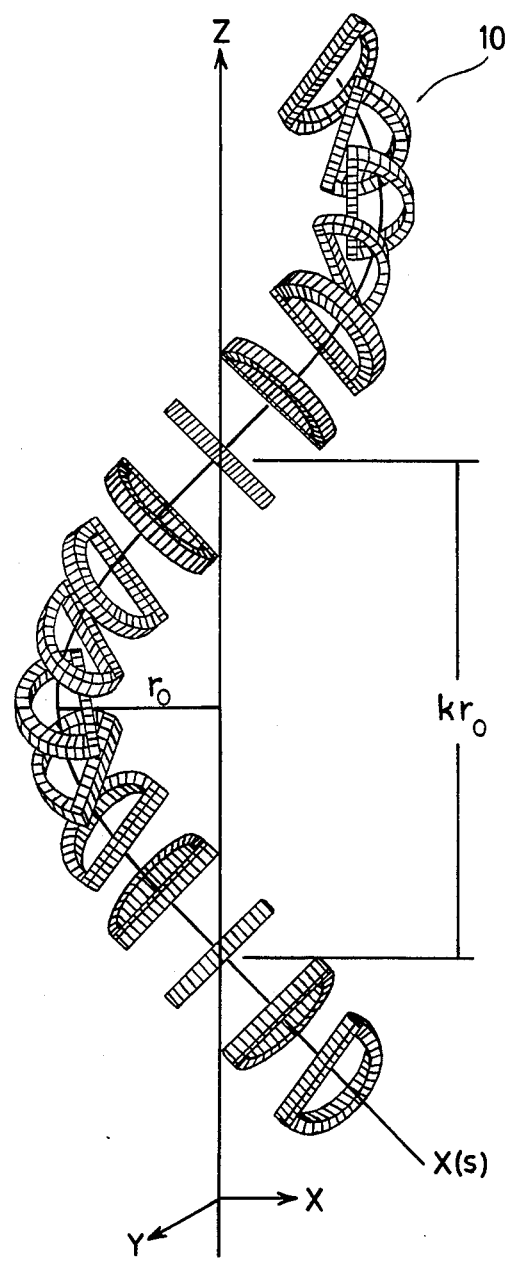

FIG. 1 shows a typical coil configuration for a modular stellarator of the present invention. Note that only a segment of the helix is shown and that no vacuum vessel is shown. The vacuum vessel would lie within the toroidal field coils 10 and the vessel axis should be substantially parallel (and usually coaxial) to the axis traced by the centers of the coils, X(s). In an actual stellarator, X(s) is a closed curve, the vacuum vessel a torus, and the coils equally spaced along the helical axis. Coils 10 in FIG. 1 are somewhat "bean" shaped, with the cusp portion of the bean being positioned towards the center of the stellarator. For "D" shaped coils, the flat portion of the coil would be positioned towards the center of the stellarator as shown in FIG. 4.

Referring to FIG. 1, the centers of the coils trace out a helix, the location of which is given in x, y, z coordinate system by:

$$\underline{X}(z) = z\,\hat{z} + r_o \cos kz\,\hat{x} + r_o \sin kz\,\hat{y} \tag{1}$$

where $r_o$ is the coil displacement from the z axis, $2/k$ the periodicity length, m the period, and $kr_o$ the pitch. If s defines the distance along the coil axis, $\underline{X}(s)$ defines the coil axis.

Our method of solving for the magnetic field generated by these coils is an analytical expansion about the coil axis. The expansion parameter is:

$$\frac{a_c}{r_h} = \frac{k^2 r_o a_c}{1 + k^2 r_o^2} \tag{2}$$

where $a_c$ is the coil radius and $r_h$ the helical radius of curvature. The smaller this quantity is, the easier it is to get a magnetic well. Note that if this expansion parameter approaches one, coils perpendicular to the axis collide. Requiring the expansion parameter to be small is reasonable since any stellarator that would be built would satisfy the condition: coil diameter small compared to the length of a stellarator period.

In a helical coordinate system $\rho$, $\theta$, s, a general vector is given by:

$$\underline{r} = \underline{X}(s) + \underline{n}(s)\rho \cos\theta + \underline{b}(s)\rho \sin\theta, \tag{3}$$

where the relationship between $\rho$ and $\theta$ is shown in FIG. 1A. In helical symmetry the magnetic field depends only on $\rho$ and $\theta$. Hence, the curve of each coil is given by:

$$\rho = a_c + \delta_2 \cos 2\theta + \delta_3 \cos 3\theta \tag{4}$$

where $a_c$, $\delta_2$, and $\delta_3$ are constants, and at least one of $\delta_2$ and $\delta_3$ is nonzero. In equation 4, $\delta_2$ determines the ellipticity of the coil and $\delta_3$ determines the triangularity. As $\delta_3$ increases from 0, the coils first become increasingly "D" shaped, then somewhat "bean" shaped. Equation 4 reduces to the equation for a circular coil when $\delta_2 = \delta_3 = 0$. Note that the coils are perpendicular to the coil axis, which is equivalent to having the s component of the coil current vanish.

From the above, rotational transform is given by:

$$\chi/m \simeq 1 - \left[\frac{1 - 4(\delta_2/a_c)^2}{1 + k^2 r_o^2}\right]^{\frac{1}{2}}, \tag{5}$$

where m is the number of periods. When there is a magnetic well, $a_c$, $\delta_2$, and $\delta_3$ are determined by:

$$\frac{\delta_3}{a_c} \gtrsim \frac{(\delta_2/a_c)^2 + k^2 r_o^2 (1 + 5/4\,\delta_2/a_c)}{3(\delta_2/a_c)(1 + k^2 r_o^2)} \frac{a_c}{r_o}. \tag{6}$$

Figure 2:
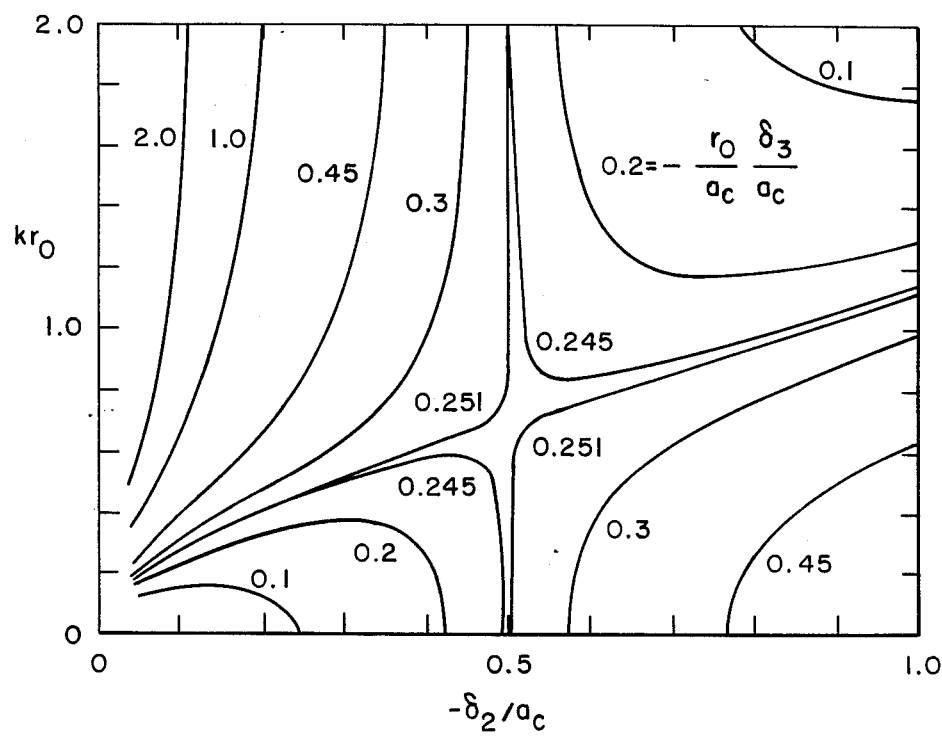
FIG. 2 is a contour plot of $(r_o/a_c)(\delta_3/a_c)$ for values of $kr_o$ and $-\delta_2/a_c$.

Equation 6 gives the coil triangularity required to produce a magnetic well for a given coil ellypticity, $\delta_2$, and a given pitch, $kr_o$, of the coil axis. Preferably, a nonzero ellipticity and triangularity are both required to get a good magnetic well from a planar coil (both $\delta_2$ and $\delta_3 \neq 0$). FIG. 2 is a contour plot of the required value of $(r_o/a_c)(\delta_3/a_c)$ as given by equation 6.

EXAMPLE

Figure 3:
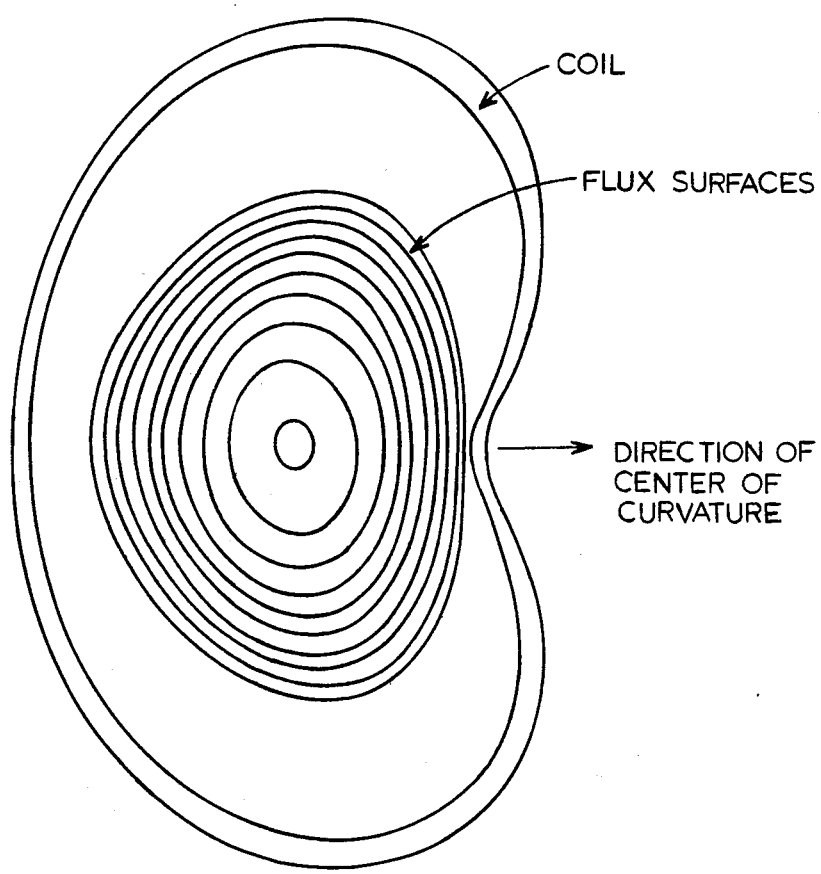
FIG. 3 shows a coil cross-section and corresponding flux surfaces for $kr_o = 1$, $\delta_2/a_c = -0.3$, and $\delta_3/a_c = -0.1$.

Taking $kr_o \simeq 1$, we obtain from FIG. 2 a magnetic well and large transform with a reasonable coil deformation. FIG. 3 shows a coil cross-section and corresponding magnetic flux surfaces for $kr_o = 1$, $\delta_2/a_c = -0.3$, and $\delta_3/a_c = -0.1$. Note that the cusp portion of this "bean" shaped coil is positioned towards the center of the stellarator (center of curvature). For this configuration, calculating rotatinal transform from equation 5, $\chi/m \simeq 0.43$. Assuming a stellarator having $m = 4$, and aspect ratio of 4, we obtain a beta of 37%

$$\left(\beta c \simeq \frac{\chi^2}{2A}\right).$$

For a larger stellarator having $m = 10$ and aspect ratio of 10, we obtain a beta of 92%. Smaller helical aspect ratios require an increasingly "bean" shaped coil (i.e. increasing triangularity) to maintain a well, whereas a "D" shaped coil is sufficient at larger helical aspect ratio.

The embodiments of this invention in which an exclusive property or privilege is claimed are defined as follows:

1. A closed, curved, planar toroidal field coil for use on a stellarator having a helical axis, said coil having a radius $r_o$, pitch $kr_o$ and period m, the curve of said coil being defined in $\rho$, $\theta$ coordinates by the relationship:

$\rho = a_c + \delta_2 \cos 2\theta + \delta_3 \cos 3\theta$ where $a_c$, $\delta_2$, and $\delta_3$ are constants and at least one of $_2$ and $_3$ is not equal to zero and wherein $a_c$, $\delta_2$, and $\delta_3$ satisfy the relationship:

$$\frac{\delta_3}{a_c} \gtrsim \frac{(\delta_2/a_c)^2 + k^2 r_o^2 (1 + 5/4\,\delta_2/a_c)}{3(\delta_2/a_c)(1 + k^2 r_o^2)} \frac{a_c}{r_o}$$

and $\delta_2 \neq 0$ and $\delta_3 \neq 0$.

2. The coil of claim 1 wherein the curve of said coil is substantially "D" shaped.

3. The coil of claim 1 wherein the curve of said coil is substantially "bean" shaped.

4. The coil of claim 1 wherein $kr_o=1$, $\delta_2/a_c=-0.3$, and $\delta_3/a_c=-0.1$.

5. Apparatus for confining a plasma comprising:
a closed endless tube; and
a plurality of closed, curved, planar coils spaced about said tube, the centers of said coils defining a helical axis, said helical axis having a radius $r_o$, pitch $kr_o$ and period m and being substantially parallel to the axis of said tube, the plane of each coil being substantially perpendicular to said helical axis, the curve of each coil being defined in $\rho$, $\theta$ coordinates by the relationship:

$$\rho = a_c + \delta_2 \cos 2\theta + \delta_3 \cos 3\theta,$$

where $a_c$, $\delta_2$, and $\delta_3$ are constants and at least one of $\delta_2$ and $\delta_3$ is not equal to zero and wherein $a_c$, $\delta_2$, and $\delta_3$ satisfy the relationship:

$$\frac{\delta_3}{a_c} \gtrsim \frac{(\delta_2/a_c)^2 + k^2 r_o^2 (1 + 5/4\, \delta_2/a_c)}{3(\delta_2/a_c)(1 + k^2 r_o^2)} \frac{a_c}{r_o},$$

where $\delta_2 \neq 0$ and $\delta_3 \neq 0$.

6. The apparatus of claim 5 wherein the axis of said tube is coaxial with the helical axis of said coils.

7. The apparatus of claim 6 wherein $kr_o=1$, $\delta_2/a_c=-0.3$, and $\delta_3/a_c=-0.1$.

* * * * *